(12) United States Patent
Repentin (10) Patent No.: US 10,374,488 B2
(45) Date of Patent: Aug. 6, 2019

(54) COMPRESSOR

(71) Applicant: BITZER Kuehlmaschinenbau GmbH, Sindelfingen (DE)

(72) Inventor: Franck Repentin, Herrenberg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 17 days.

(21) Appl. No.: 15/485,902

(22) Filed: Apr. 12, 2017

(65) Prior Publication Data

US 2017/0222520 A1     Aug. 3, 2017

Related U.S. Application Data

(63) Continuation of application No. PCT/EP2014/071927, filed on Oct. 13, 2014.

(51) Int. Cl.
*H02K 1/24* (2006.01)
*H02K 7/14* (2006.01)
(Continued)

(52) U.S. Cl.
CPC ............ *H02K 9/12* (2013.01); *F25B 31/006* (2013.01); *F25B 31/02* (2013.01); *H02K 1/246* (2013.01);
(Continued)

(58) Field of Classification Search
CPC ............ H02K 1/20; H02K 1/24; H02K 1/246; H02K 1/32; H02K 7/14; H02K 9/19;
(Continued)

(56) References Cited

U.S. PATENT DOCUMENTS

| | | | | |
|---|---|---|---|---|
| 3,663,127 A | * | 5/1972 | Cheers | F04B 35/04 417/372 |
| 6,231,317 B1 | * | 5/2001 | Watanabe | F04C 29/028 417/410.5 |
| 7,737,592 B2 | * | 6/2010 | Makino | H02K 1/276 310/156.09 |
| 2003/0173861 A1 | | 9/2003 | Kawaguchi et al. | |

(Continued)

FOREIGN PATENT DOCUMENTS

| | | |
|---|---|---|
| CN | 101741198 A | 6/2010 |
| CN | 102047531 A | 5/2011 |

(Continued)

*Primary Examiner* — Tran N Nguyen
(74) *Attorney, Agent, or Firm* — Reinhart Boerner Van Deuren P.C.

(57) ABSTRACT

In a compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, each disc element having a plurality of flux barriers configured to give the rotor core an anisotropic magnetic structure and formed as apertures in said disc element, it is provided that said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections being designed to uncover at least 70% of the cross section of apertures defined by said flux barriers in the respective disc element forming the respective front side of said rotor core.

20 Claims, 12 Drawing Sheets

(51) Int. Cl.
*H02K 9/12* (2006.01)
*H02K 5/12* (2006.01)
*F25B 31/00* (2006.01)
*F25B 31/02* (2006.01)
*H02K 19/02* (2006.01)
*H02K 1/32* (2006.01)

(52) U.S. Cl.
CPC .................. *H02K 5/12* (2013.01); *H02K 7/14* (2013.01); *H02K 19/02* (2013.01); *H02K 1/32* (2013.01); *H02K 2213/03* (2013.01)

(58) Field of Classification Search
CPC ...... H02K 9/20; H02K 15/00; H02K 15/0012; H02K 17/16; H02K 17/165; H02K 19/10; F04C 29/02; F04C 29/028; F04B 39/02
See application file for complete search history.

(56) References Cited

U.S. PATENT DOCUMENTS

| | | | |
|---|---|---|---|
| 2006/0222528 A1* | 10/2006 | Shin | F04C 29/028 417/410.5 |
| 2007/0024129 A1* | 2/2007 | Pfannschmidt | H02K 1/20 310/59 |
| 2007/0108853 A1* | 5/2007 | Shah | H02K 1/246 310/61 |
| 2007/0170803 A1 | 7/2007 | Yabe et al. | |

FOREIGN PATENT DOCUMENTS

| | | |
|---|---|---|
| CN | 102738937 A | 10/2012 |
| CN | 103098346 A | 5/2013 |
| CN | 203423562 U | 2/2014 |
| JP | 2001/169484 A | 6/2001 |
| WO | WO 2010/131233 A2 | 11/2010 |

* cited by examiner

COMPRESSOR

CROSS-REFERENCE TO RELATED PATENT APPLICATIONS

This application is a continuation of international application number PCT/EP2014/071927 filed on Oct. 13, 2014.

This patent application claims the benefit of International application No. PCT/EP2014/071927 of Oct. 13, 2014 the teachings and disclosure of which are hereby incorporated in their entirety by reference thereto.

BACKGROUND OF THE INVENTION

The invention relates to a compressor for refrigerant having a suction inlet for refrigerant and a pressure outlet for compressed refrigerant said compressor comprising a compression unit and an electric motor driving said compression unit, said electric motor being a synchronous reluctance motor having a stator and a rotor, said rotor comprising a plurality of stacked disc elements, said disc elements forming a rotor core, each disc element having a plurality of flux barriers configured to give the rotor core an anisotropic magnetic structure and formed as apertures in said disc element.

Such a compressor is known from WO 2010/131233 A2 according to which the flux barriers provide an open surface in said disc elements for the refrigerant in order to cool said rotor core.

It is the object of the present invention to provide a design for said rotor which keeps the disc elements of the rotor core tightly connected to each other and which also enables an efficient cooling of said electric motor, in particular said rotor core.

SUMMARY OF THE INVENTION

This object is solved by a compressor as mentioned above wherein said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections being designed to uncover at least 60% of the cross section of said apertures defined by said flux barriers in the respective disc element forming the respective front side of said rotor core.

The advantage of the present invention is that on one hand the support elements provide effective means for keeping the disc elements of the rotor core in tight relationship with respect to each other and on the other hand the support elements according to the present invention enable efficient cooling of said rotor core due to the fact that the flow of refrigerant through said channels defined by said flux barriers is only affected to a limited extend by said support elements due to the design of the cut-out sections as defined before.

It is of particular advantage if the support elements are designed such that at least 70% of the cross section of said apertures in the respective front side is uncovered.

It is even more of an advantage if the cut-out sections in said support elements are designed such that at least 80%, preferably at least 90%, of the cross sections of said apertures in the respective front side is uncovered.

According to the present invention in particular rotor cores with different numbers of poles, in particular even numbered poles such for example as two, four, six, eight poles, can be realized.

According to an advantageous design the channels are extending through said rotor core from one of said front sides to the other one of said front sides.

In particular the channels run in said rotor core in direction parallel to said rotor axis.

In order to obtain an optimum design of said support elements a preferred design provides that said support elements have arms acting on flux paths of the respective disc elements forming the respective front sides of said rotor core so that with these arms the support elements can easily act on said front sides in order to compress the disc elements of said rotor core arranged between the support elements.

The flux paths as defined before are not specified with respect to their extension with respect to the rotor axis.

It is of particular advantage if said arms are acting on flux paths extending in radial direction to said rotor axis because acting on these flux paths allows a specific advantageous overall compactation of said flux elements in said rotor core.

In order to reduce the influence of said arms of said support elements on the flow of refrigerant through said channels in said rotor core one advantageous solution provides that an angular width of said arms of said support elements is limited to the angular width of the respective radial flux path so that the arms are not affecting the cross section of said apertures of said channels extending through said rotor core.

A further advantageous embodiment provides that said support elements have an outer ring acing on outer ring portions of the respective disc element forming said respective front side of said rotor core.

Such an outer ring enables the support element to act on the disc elements of said rotor core at a large radial distance from said rotor axis in order to keep said disc elements in tight abutment in particular in the areas formed by said outer ring portions of said disc elements.

Further it is of advantage if said support elements have an inner ring acting on an inner ring portion of the respective disc element forming the respective front side of said rotor core. This solution has the advantage that the support element can act on the disc elements in an area close to said rotor axis and in particular on an area of said disc elements surrounding a shaft extending through said rotor core and carrying said rotor core.

The inner ring can be further used for a runout tolerance as lay-on surface.

In order to enable the support elements to act with sufficient force on said rotor core arranged between said support elements said support elements are connected by connecting elements extending through said rotor core.

The connecting elements could for example be elements surrounding the shaft and being arranged between the shaft and said rotor core.

It is of particular advantageous it said connecting elements are arranged in connecting channels formed by connection openings in said disc elements so that these connecting channels can be arranged at a certain radial distance from said rotor axis.

It is further of advantage if connection openings in said support elements are arranged in said arms acting on flux paths of the disc elements.

Further the use of support elements provides the chance to use counterbalancing elements in order to counter balance the rotor core and these counterbalancing elements can be fixed or releasably fixed to said support elements so that there is no need to provide any fixture of counterbalancing elements on disc elements of said rotor core which would affect the magnetic structure of said rotor core.

The support elements can further be used to axially and/or radially fix inserted permanent magnets.

A further preferred solution of the present invention provides a compressor wherein the support elements for the rotor core are provided with flow reducing elements for reducing flow of refrigerant through at least part of said channels.

Said flow reducing elements can be for example screen elements or other partially refrigerant permeable elements, or even elements non-permeable for refrigerant.

One preferred solution provides that the flow reducing elements are cover elements covering at least part of said channels.

In order to be able to adapt the flow of refrigerant through the rotor it is provided that said flow reducing elements are releasably mounted on said support elements.

With respect to the design of the compressor itself there have been no further details given before.

One preferable solution provides that the compressor is provided with a motor housing section said motor housing section being provided with a suction inlet.

This solution has the advantage that the suction inlet enables to supply refrigerant, in particular refrigerant before being supplied to said compression unit, to said motor housing in order to cool said motor.

In order to enable efficient cooling of said rotor it is of particular advantage if said motor housing section supplies refrigerant to a first front side of the rotor in order to enable the efficient cooling of said rotor.

The cooling of the said rotor is further improved if refrigerant is guided in axial directions through said channels in said rotor from said first front side of said rotor to a second front side of said rotor so that the rotor is cooled over its entire length.

Further it is of advantage if refrigerant is discharged from a second front side of said rotor and guided to said compression unit for compression thereof.

In order to optimize the flow of refrigerant to said rotor one preferred solution provides that the suction inlet supplies refrigerant to said electric motor through a suction opening arranged coaxial to an axis of rotation of said rotor.

In particular the housing section is designed such that it is guiding said refrigerant supply through said suction opening to the first front side of said rotor.

According to the present invention no further details have been given with respect to the arrangement of a rotatable shaft carrying said rotor in said electric motor.

In principle it would be possible to have the shaft received in bearing systems of said compression unit and extending from said compression unit to said rotor so that the rotor is held by a freely extending end portion of the shaft extending from said compression unit into said electric motor.

In case of a synchronous reluctance motor it is of advantage to have the rotor precisely guided within the stator in order to reduce the space between said rotor and said stator.

Therefore it is of particular advantage if said rotor is arranged on a shaft and said shaft is supported by bearing systems arranged on opposite sides of said rotor.

Another advantageous embodiment provides that said shaft is supported by bearing systems arranged on opposite sides of said compressor unit.

One advantageous concept provides that said shaft is provided by a first and a second bearing system arranged on opposite sides of a said compression unit and also by a third bearing system arranged on an end of said shaft facing away from said compression unit and extending beyond said rotor so that in addition the shaft is received in two bearing systems on opposite sides of said rotor.

Further features and advantage of the present invention are outlined in the detailed specification as well as the figures.

DETAILED DESCRIPTION OF THE INVENTION

Figure 1:
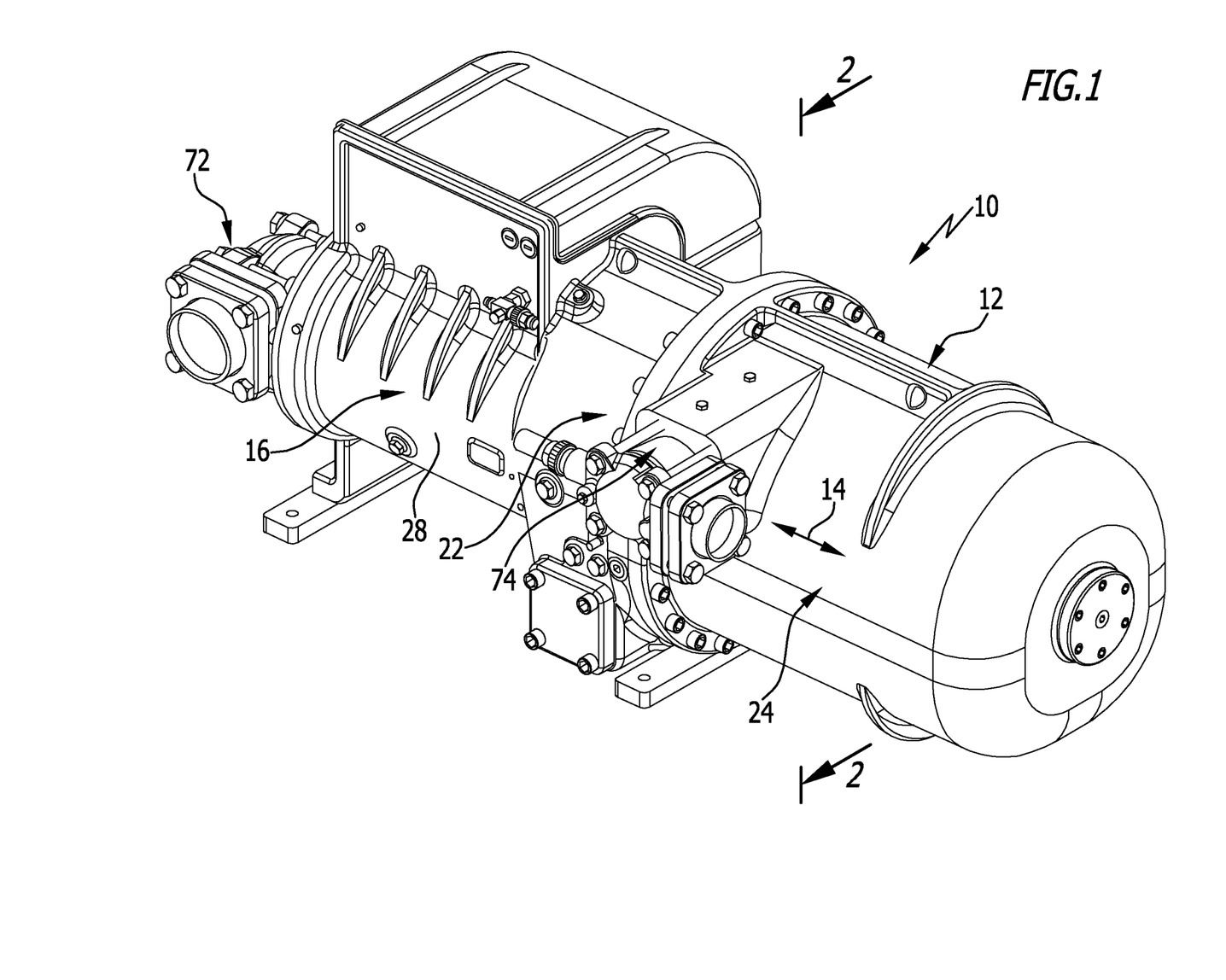
FIG. 1 shows a perspective view of one embodiment of a compressor according to the present invention.

A compressor 10 for refrigerant as shown in FIG. 1 comprises a compressor housing 12 extending in a longitudinal direction 14, said compressor housing itself comprises a motor housing section 16, a compression housing section 22 and a high-pressure housing section 24 arranged in sequence in said longitudinal direction 14.

Motor housing section 16 is provided on its side opposite to said compression housing section 22 with a cover 26 releasably connected to a housing shell 28 surrounding a receptacle 32 receiving an electric motor 34.

Figure 2:
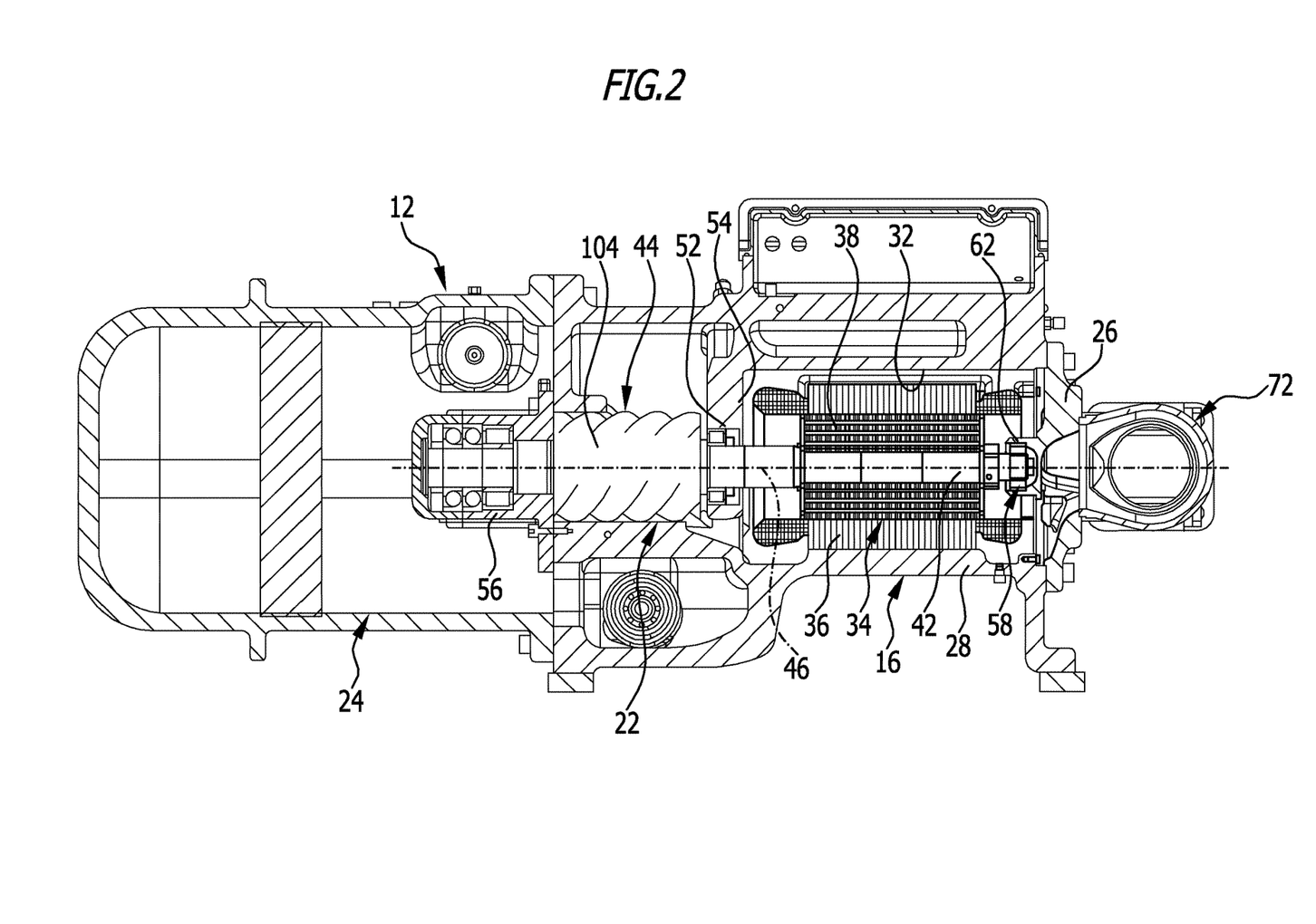
FIG. 2 shows a sectional view along lines 2-2 in FIG. 1
Figure 3:
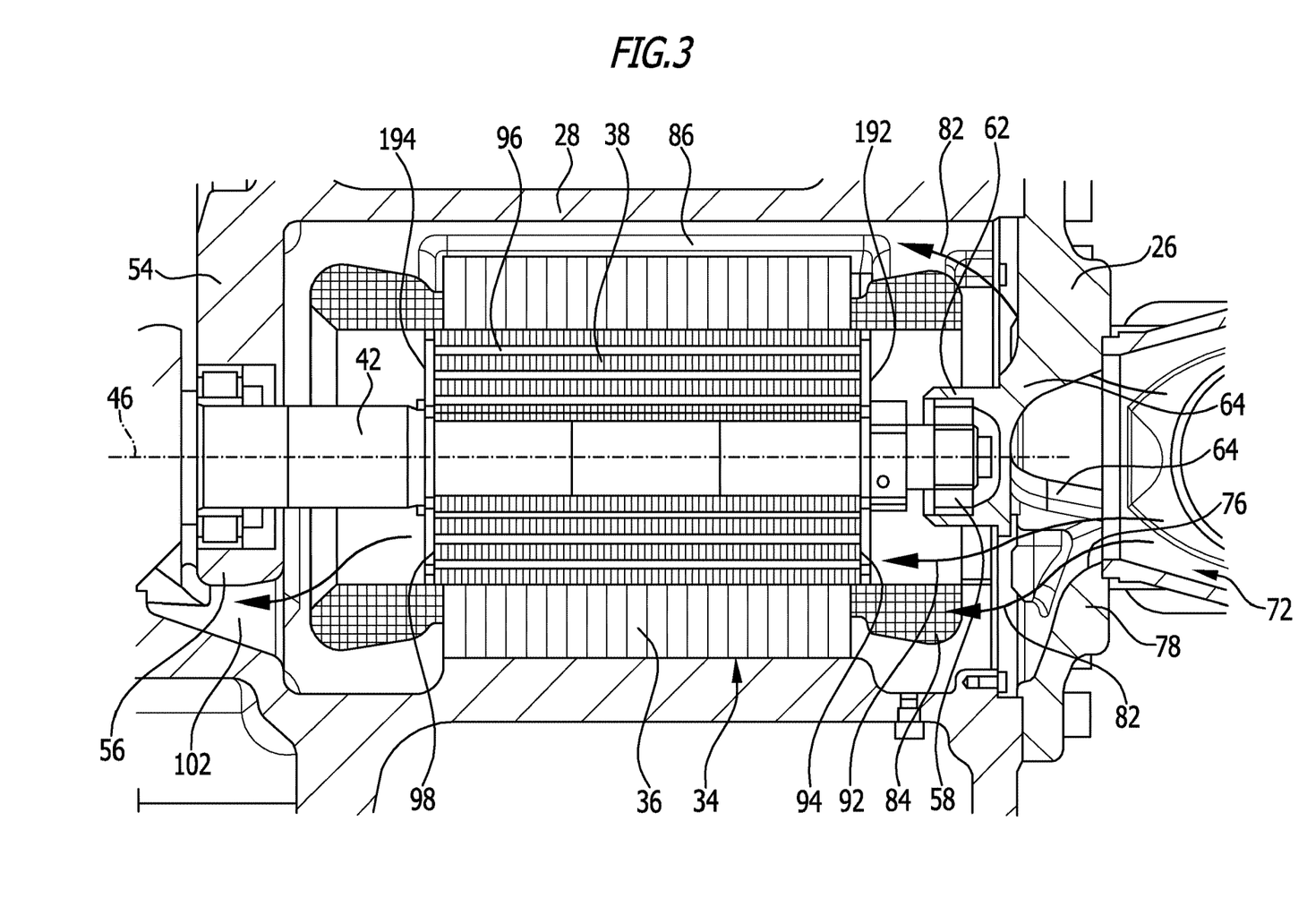
FIG. 3 shows an enlarged sectional view according to FIG. 2 in the area of the electric motor.

Electric motor 34 comprises a stator 36 arranged in said receptacle 32 and fixed to said housing shell 28 as well as a rotor 38 arranged within said stator 36.

Said rotor 38 is mounted on a shaft 42 extending not only through said rotor 38 but also through a compression unit 44.

Shaft 42 is preferably rotatably mounted about an axis of rotation 46 in a first bearing system 52 arranged between said compression unit 44 and said electric motor 34 in wall 54 arranged between said compression unit 44 and said motor 34 and preferably separating said receptacle 32 for said electric motor 34 from said compression unit 44.

Further shaft 42 is held by a second bearing system 56 arranged on a side of said compression unit 44 opposite to said electric motor 34.

Preferably the second bearing system 56 is arranged inside high-pressure housing section 24.

In addition to the first bearing system 52 and the second bearing system 56 shaft 42 is further rotatably mounted in a third bearing system 58 which is arranged on a side of said electric motor 34 opposite to said compression unit 44.

Preferably third bearing system 58 is mounted in a bearing carrier 62 connected to cover 26 by support arms 64 so that bearing carrier 62 is fixedly connected to motor housing section 16.

Compressor housing 12 is further provided with a suction inlet 72 to which refrigerant is supplied to and a pressure outlet 74 through which compressed refrigerant is leaving compressor housing 12.

As can be seen from FIGS. 1 to 3 suction inlet 72 is arranged on motor housing section 16, in particular on cover 26 of motor housing section 16 and supplies refrigerant, in particular uncompressed refrigerant or refrigerant under low pressure, which means pressure lower than the pressure at the pressure outlet 74, to an inlet opening 76 arranged in cover 26, preferably concentrically to the axis of rotation 46.

Inlet opening 76 is further arranged in axial distance from bearing carrier 62 on a side of bearing carrier 62 opposite to said electric motor 34 and support arms 64 are extending from an outer cover section 78 of cover 26 arranged around inlet opening 76 to bearing carrier 62 so that refrigerant entering receptacle 32 for cooling said electric motor 34 can flow through free spaces between support arms 64 and around bearing carrier 62 in order to meet electric motor 34 for cooling.

In particular a first flow path 82 for refrigerant is directed to hit motor windings 84 of stator 36 in order the cool motor windings 84 directly and in order to flow around stator 36 through cooling channels 86 provided between stator 36 and housing shell 28.

Further a second flow path 92 for the refrigerant hits a first front side 94 of rotor 38, passes through cooling channels 96 in said rotor 38 and exits from rotor 38 through a second front side 98 arranged opposite to first front side 94 on said rotor 38.

First flow path 82 and second flow path 92 both when reaching wall 54 pass through suction opening 102 in order to enter compression unit 44.

For example compression unit 44 can be designed as a screw compressor comprising two interacting screws 104.

However compression unit 44 can also be designed to be a piston compressor or a scroll compressor.

Figure 4:
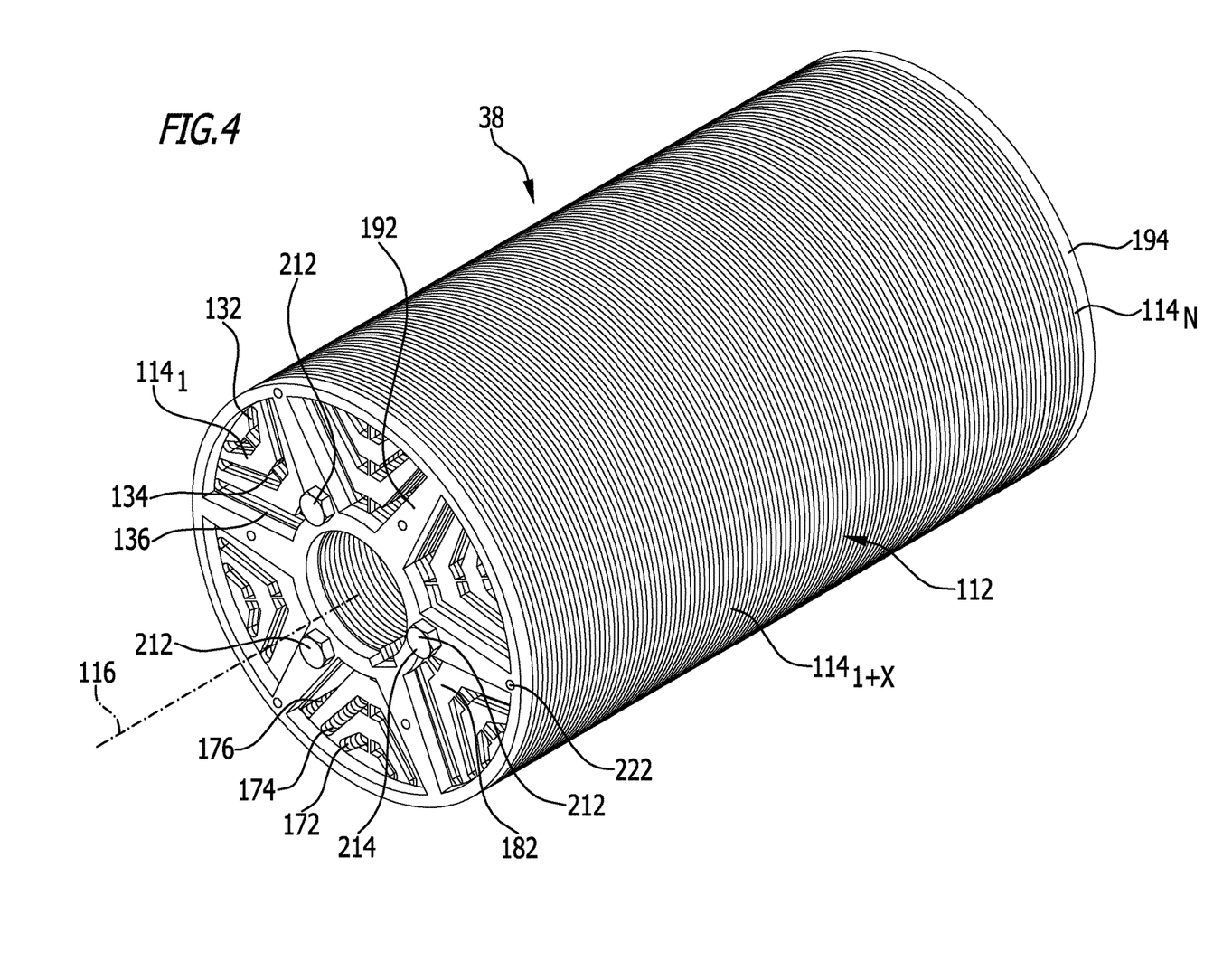
FIG. 4 shows a perspective view of a rotor of the synchronous reluctance motor according to the present invention.

Electric motor 34 is designed to be a synchronous reluctance motor having a rotor core 112, as shown in FIG. 4, made of a stack of disc elements 114, with all disc elements 114 being preferably of identical design.

Figure 5:
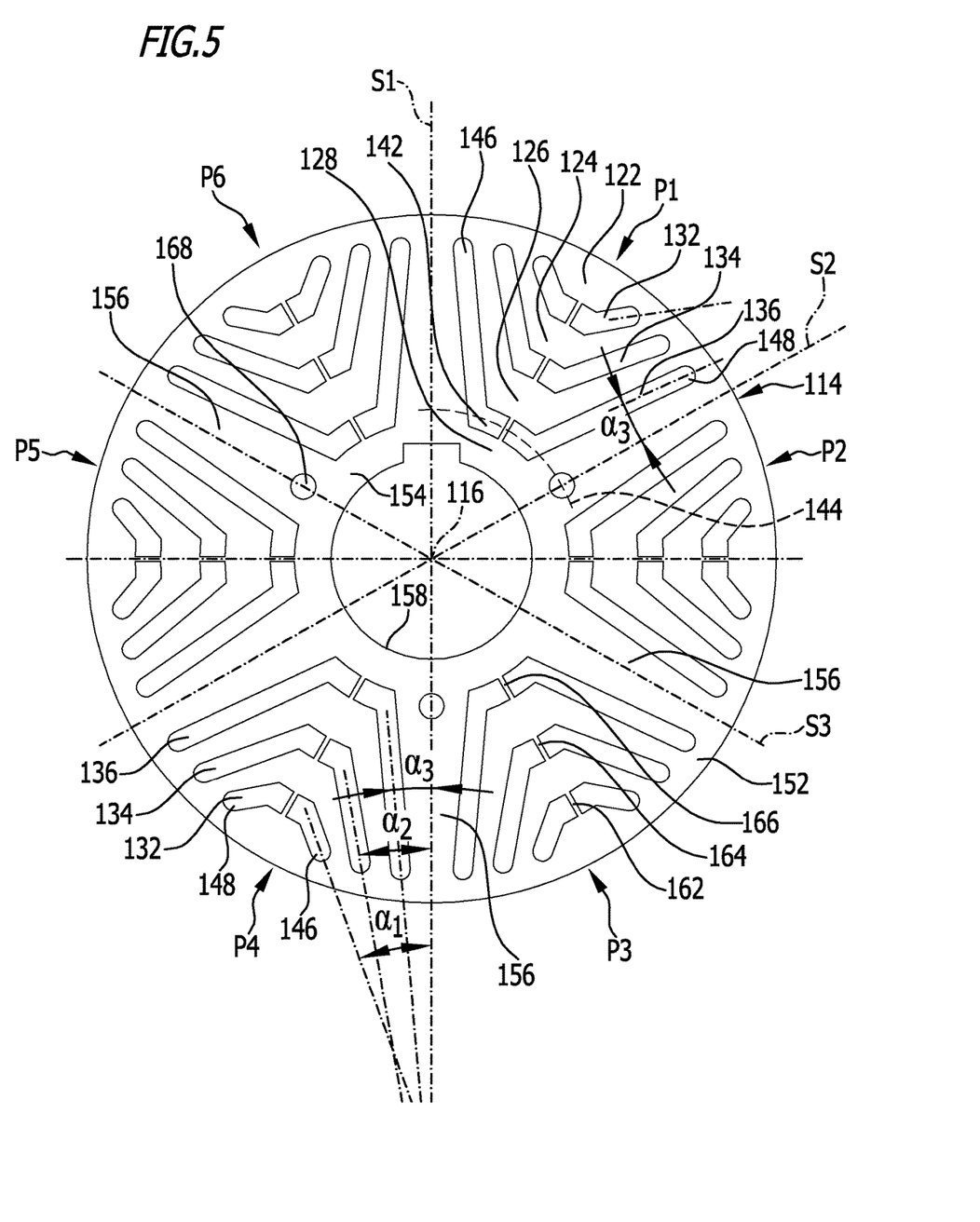
FIG. 5 shows a top view on a disc element of the rotor according to the present invention.

Each disc element 114 comprises a plurality of substantially identical poles, for example poles P1 to P6, distributed evenly around rotor axis 116 which in electric motor 34 coincides with axis of rotation 46.

However rotor cores 112 with different numbers of poles, in particular even numbered poles such as two, four, six, eight poles, can be realized.

In the design shown in FIG. 5 each disc element 114 comprises for example six poles P1 to P6 whereas each pole P1 to P6 covers a sector extending over an angular distance of 60° of disc element 114.

A first pole P1 and a fourth pole P4 are limited by separating lines S1 and S2 drawn as dashed lines in FIG. 5 the first pole P1 and the fourth pole P4 are and arranged on opposite sides of rotor axis 116.

A second pole P2 and a fifth pole P5 are arranged within separating lines S2 and S3 and a third pole P3 and a sixth pole P6 are arranged between separating lines S3 and S1.

Poles P2 and P5 as well as poles P3 and P6 are and also arranged on opposite sides of rotor axis 116.

Within each pole P1 to P6 each disc element 114 is provided with flux guiding portions 122 to 128 having a high magnetic permeability whereas these flux guiding portions 122 to 128 are separated by flux barriers 132, 134, 136.

According to the present invention the flux barriers 132, 134, 136 are cut-outs in the respective disc element 114 and each of said flux barriers 132, 134, 136 comprises a central segment 142 extending along a geometric circular line 144 around rotor axis 116 and two side sections 146, 148 extending from opposite sides of said central section 142 at an angle α with respect to a strictly radial direction to rotor axis 116 whereas an angle $\alpha_1$ between a strict radial direction and the respective side sections 146, 148 of the first flux barrier 132 is greater than an angle $\alpha_2$ between side sections 146, 148 of flux barrier 134 and the angle $\alpha_3$ between side section 146, 148 and a radial direction of flux barrier 136 is even smaller than $\alpha_2$ and $\alpha_1$.

All outer flux guiding portions 122 of poles P1 to P6 are connected by an outer ring portion 152 and all inner flux guiding portions 128 of poles P1 to P6 are interconnected by inner ring portion 154.

Further the inner flux guiding portions 128 of adjacent poles, for example pole P1 and P2, extend towards the respective separating line S2 and merge into each other along separating line S2.

As a result the inner flux guiding portions 128 of each disc element 114 form radial arm portions 156 extending between outer ring portion 152 and inner ring portion 154 in radial direction to rotor axis 116 and symmetric to separating lines S1, S2 and S3 separating the various poles P1 to P6 from each other.

In order to receive shaft 42 inner ring portion 154 surrounds a shaft receiving opening 158 arranged coaxial to rotor axis 116.

In order to improve stability of each disc element 114 flux guiding portions 122, 124, 126 and 128 are interconnected by small bridging elements 162 to 166 extending across the flux barriers 132, 134 and 136.

As shown in FIG. 5 each radial arm 156 is provided with a fixing opening 168.

If all disc elements 114 are stacked with the same orientation with respect to each other all flux barriers 132 to 136 are arranged on top of each other so that the plurality of flux barriers 132 forms a channel 172 extending parallel to rotor axis 116 throughout rotor core 112.

Further the plurality of flux barriers 134 forms a channel 174 extending parallel to rotor axis 116 throughout rotor core 112 and the plurality of flux barriers 136 forms a channel 176 also extending throughout rotor core 112 parallel to rotor axis 116 throughout rotor core 112.

As can be seen in FIG. 4 the first disc element $114_1$ with its front side 182 facing away from core 112 forms a front side of rotor core 112 and the flux barriers 132, 134 and 136 due to the fact that they are cut-outs in the first disc element $114_1$ form access openings to channels 172, 174, 176 extending from front side 182 of rotor core 112 to the opposite front side of rotor core 112 in which the corresponding flux barriers 132, 134, 136 also provide access to channels 172, 174, 176.

In order to keep the stack of disc elements 114 abutting each other the rotor core 112 is provided with support elements 192, 194 abutting on the respective front sides 182 of rotor core 112.

Figure 6:
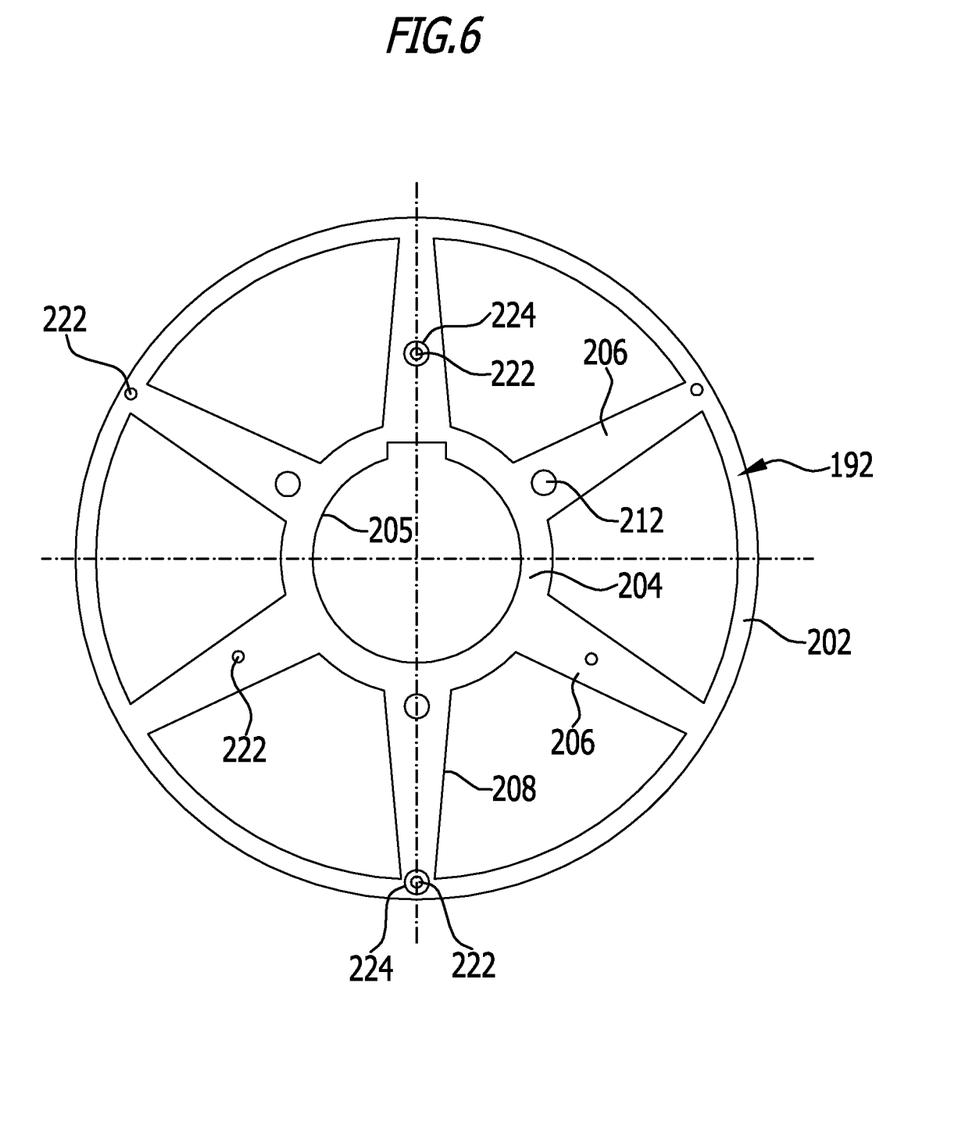
FIG. 6 shows a top view on a support element for the rotor according to the present invention.

Each support element, for example support element 192, shown in FIG. 6 comprises an outer ring 202, an inner ring 204 with receiving opening 205 as well as radial arms 206 extending between outer ring 202 and inner ring 204.

Preferably the number of radial arms 206 of support elements 192, 194 corresponds to the number of radial arm portions 156 of the respective disc elements 114 and the outer ring 202 the inner ring 204 and the radial arms 206 are designed such that they only abut on the respective outer ring portion 152, the respective inner ring portion 154 and the respective radial arm portions 156 of the respective first and last disc elements $114_1$ to $114_N$ forming the respective front sides 182.

Support elements 192 and 194 are provided with cut-out sections 208 between the respective outer ring 202, the inner ring 204 and the radial arms 206 having a size so as to keep all the flux barriers 132, 134, 136 of the first disc element $114_1$ and the last disc element $114_N$ uncovered by the support elements 192, 194 in order to allow access to channels 172, 174 and 176 in the respective front face 182 if the support elements 192 and 194 are mounted.

In particular the radial arms 206 have an angular width which is smaller the angular width of radial arm portions 156 such that radial arms 206 are arranged within the outer contour of the radial arm portions 156 of the first disc element $114_1$ and the last disc element $114_N$.

Therefore the support elements 192, 194 with their cut-out sections 208 provide full access to channels 172, 174 and 176 extending parallel to rotor axis 116 through the entire rotor core 12, which channels 172, 174, 176 are used as cooling channels 96 extending through rotor 38 as mentioned before.

In order to keep the disc elements 114 compacted together support elements 192 and 194 are connected by connecting elements 212, preferably connecting rods, which extend through connecting channels 214 in said rotor core 112 formed by the plurality of connecting openings 168 of said disc elements 114 and respective openings 212.

Connecting elements 212 enable pretensioning of support elements 192 and 194 in directions towards each other so that the stack of disc elements 114 forming rotor core 112 and arranged between said support elements 192 and 194 is tied together by said support elements 192, 194.

For counterbalancing rotor 38 support elements 192, 194 are provide with fixing means 222 for fixing counterbalancing elements 224.

For example fixing means 222 are designed to be recesses in which counterbalancing elements 224 can be mounted.

Figure 7:
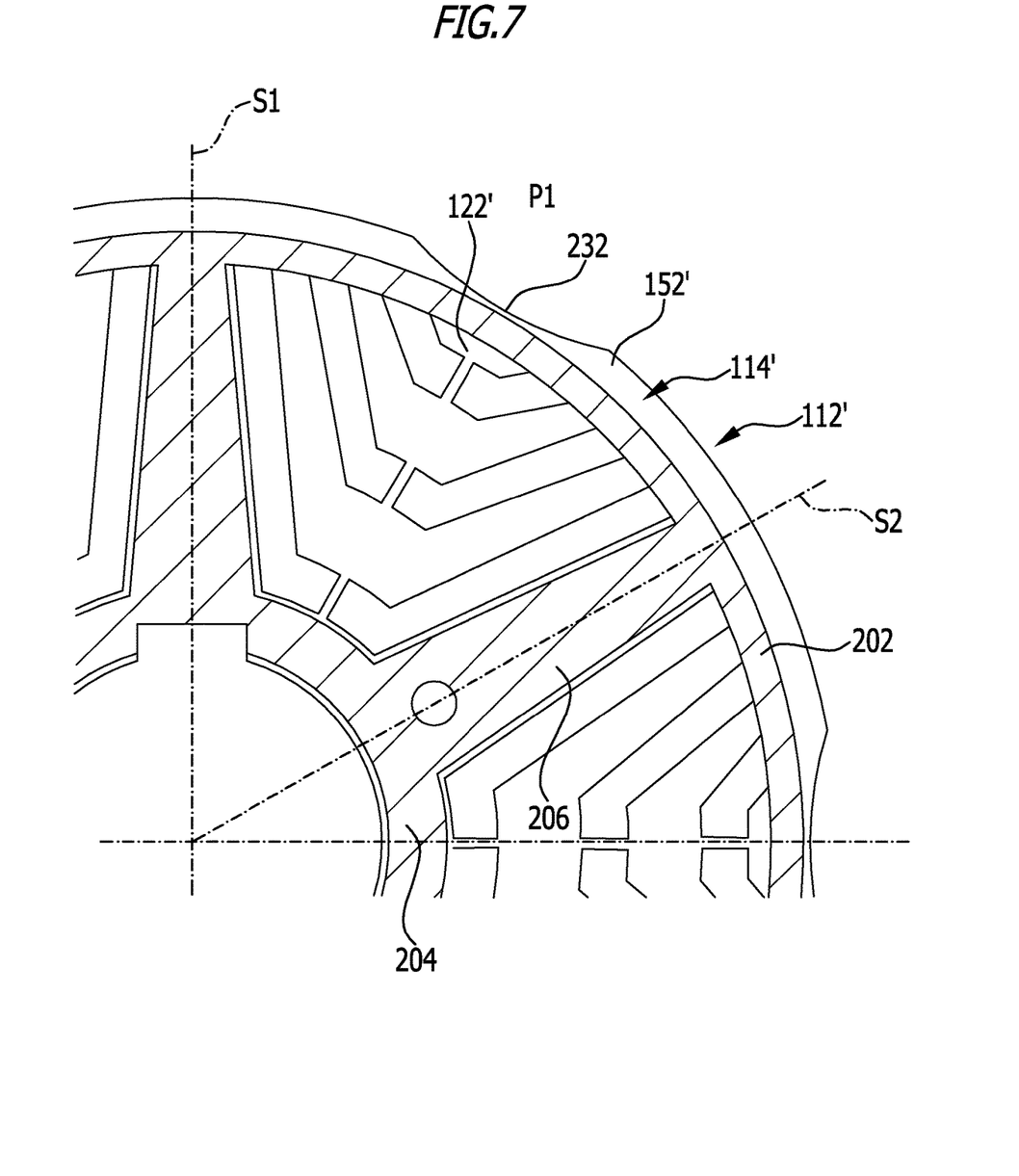
FIG. 7 shows an enlarged top view on a front side of said rotor of a second embodiment of the present invention.

A second embodiment of the present invention as shown in FIG. 7 differs from the first embodiment by the fact that the respective disc elements 114' on their outer ring portions 152' are provided with an outer recess 232 which increases the flow of refrigerant between rotor and stator.

In particular the outer recess 232 is arranged in the center of the respective pole P, as shown in FIG. 6 in the center of pole P1, and therefore in the middle between the respective separating lines, in case of pole P1 separating lines S1 and S2, limiting the respective poles P.

Figure 8:
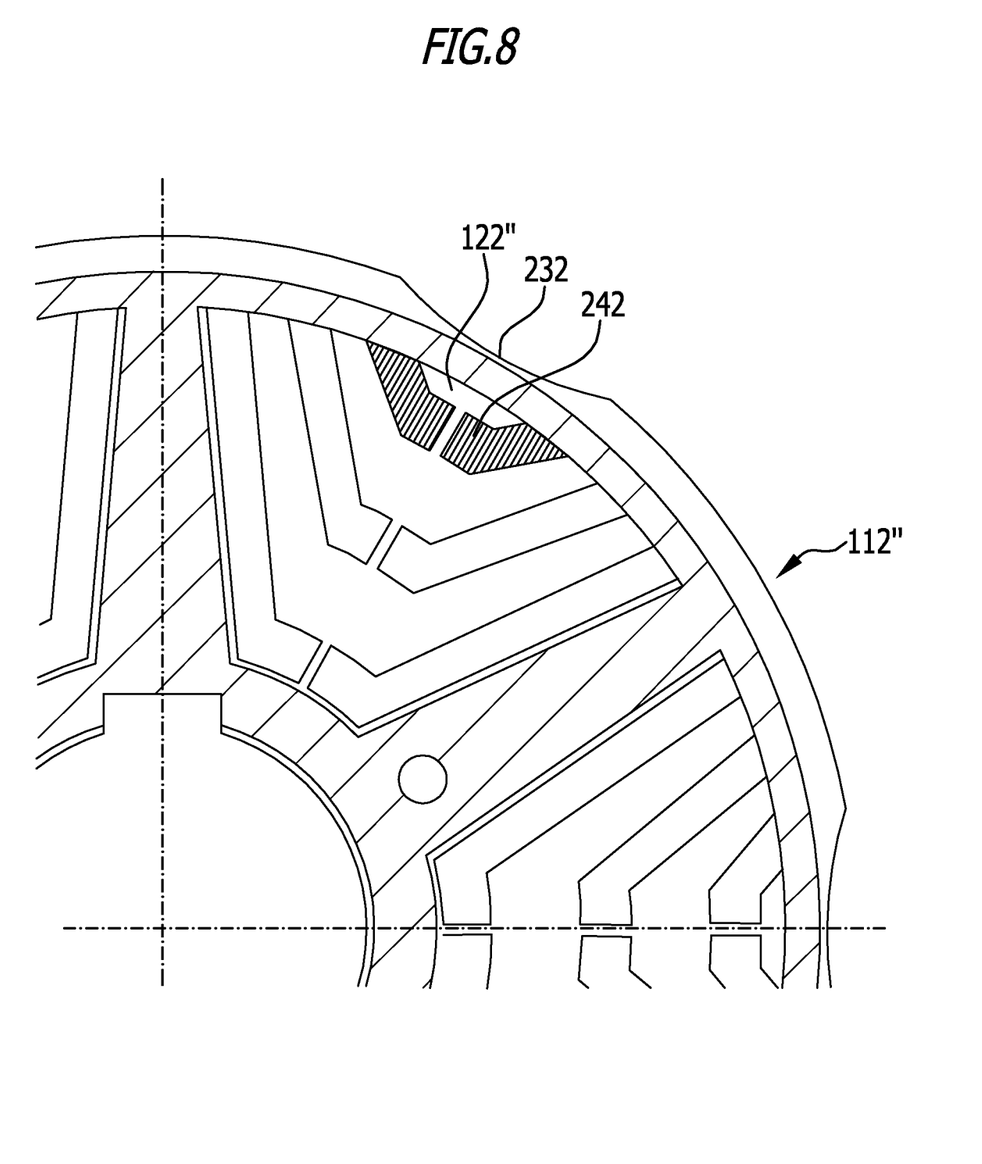
FIG. 8 shows an enlarge view according to FIG. 6 of a third embodiment of the present invention.

A third embodiment, shown in FIG. 8, differs from the aforementioned embodiments by having a radially outer channel of rotor core 112" is filled with permanent magnetic material 242 which improves the efficiency of rotor 112".

In particular permanent magnetic material 242 enables to increase the gap between rotor 38 and stator 36.

With respect to all other features which are not mentioned in connection with the second and third embodiment, the second and third embodiment are identical with the first embodiment so that with respect to the non-explained features reference is made to the explanations given in connection with the first embodiment.

Figure 9:
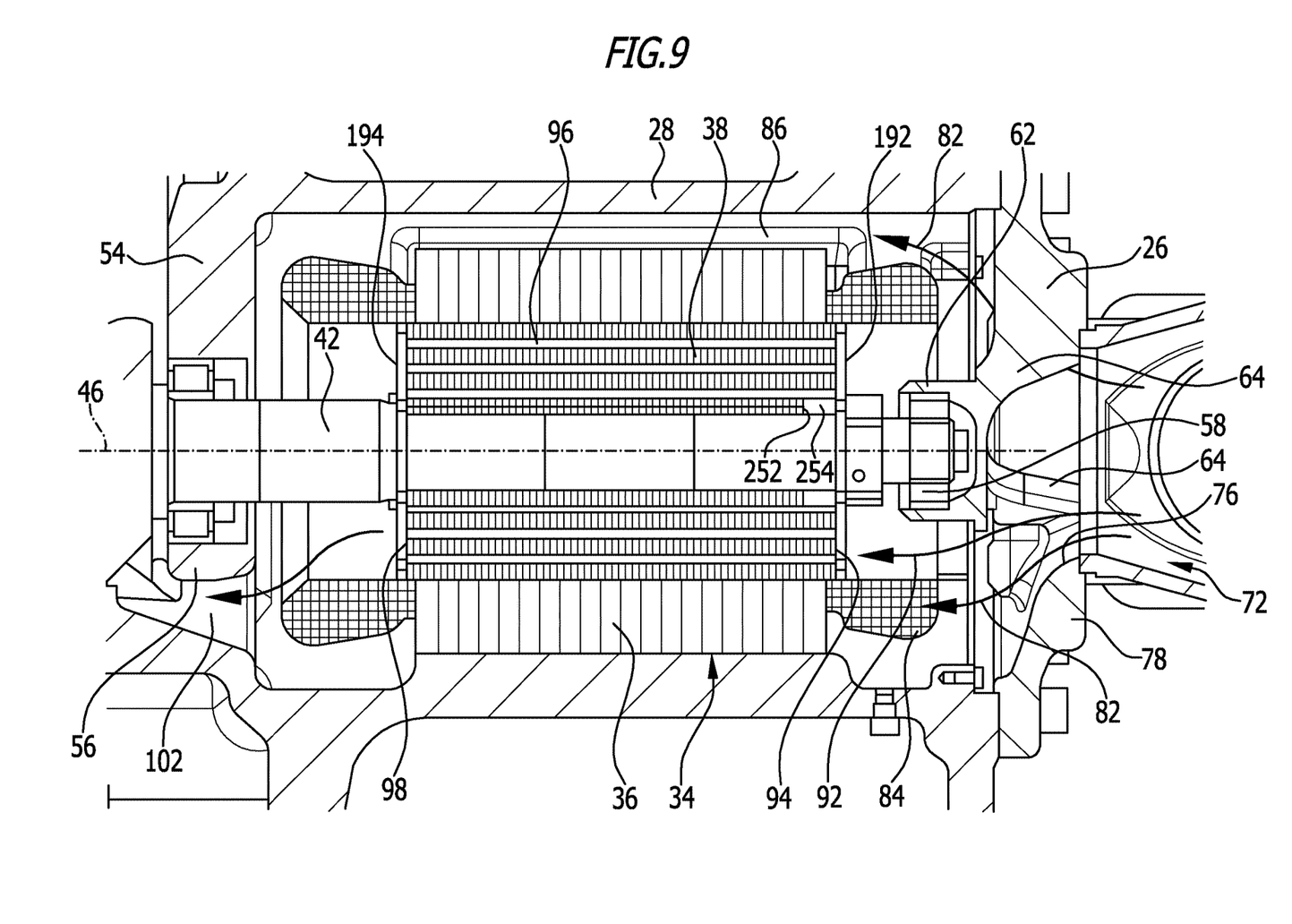
FIG. 9 shows a sectional view similar to FIG. 3 of a fourth embodiment of the present invention.

According to a fourth embodiment shown in FIG. 9 rotor 38 is provided with a recess 252 receiving a fixing element 254 for axially fixing rotor 38 on shaft 42.

Figure 10:
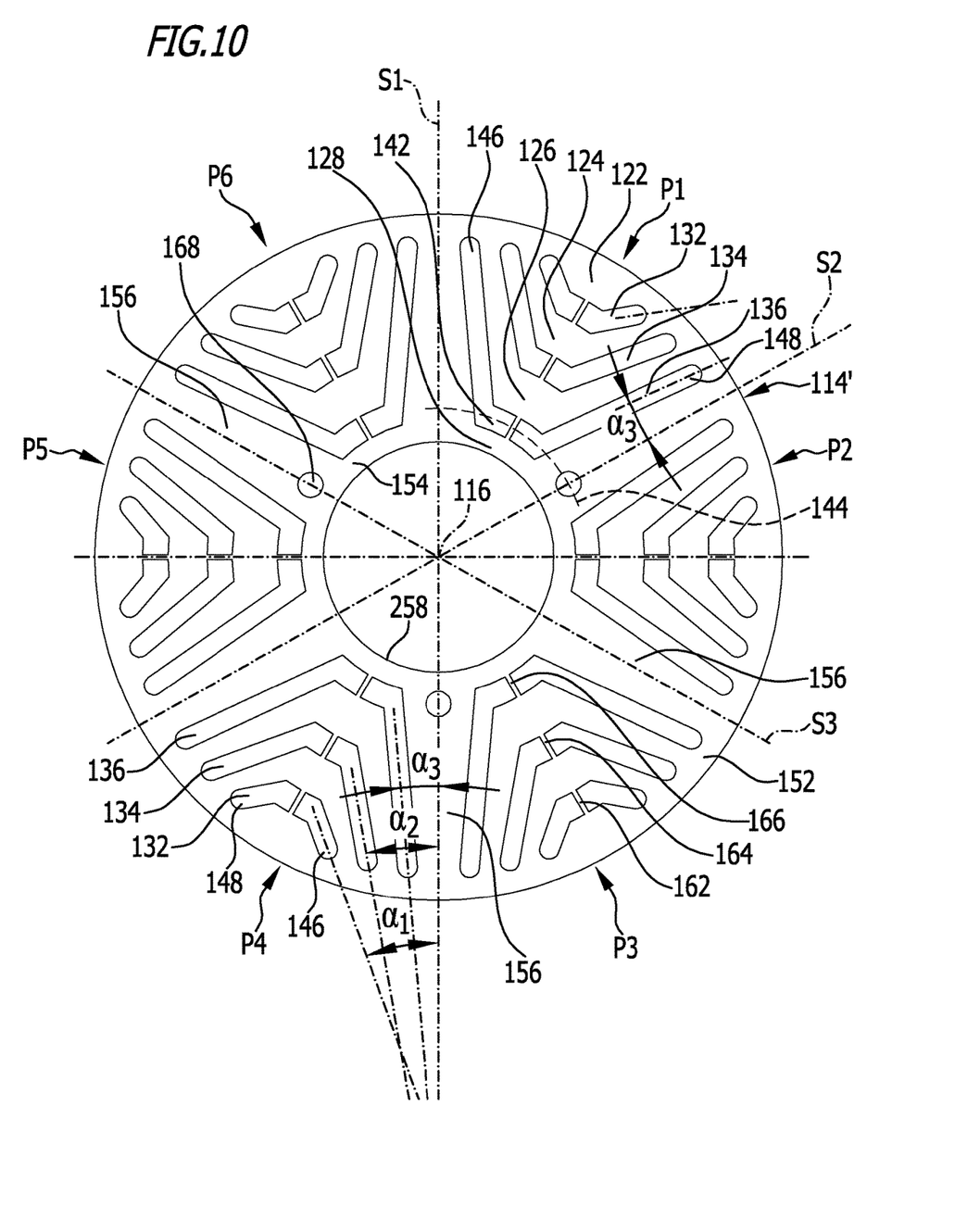
FIG. 10 shows a top view similar to FIG. 5 on a disc element with enlarged receiving opening according to the fourth embodiment.

Recess 252 is obtained by providing a member disc elements 114' of rotor core 112 which are arranged adjacent support element 192 with a receiving opening 258 enlarged with respect to receiving opening 158 of the other disc elements 114.

Figure 11:
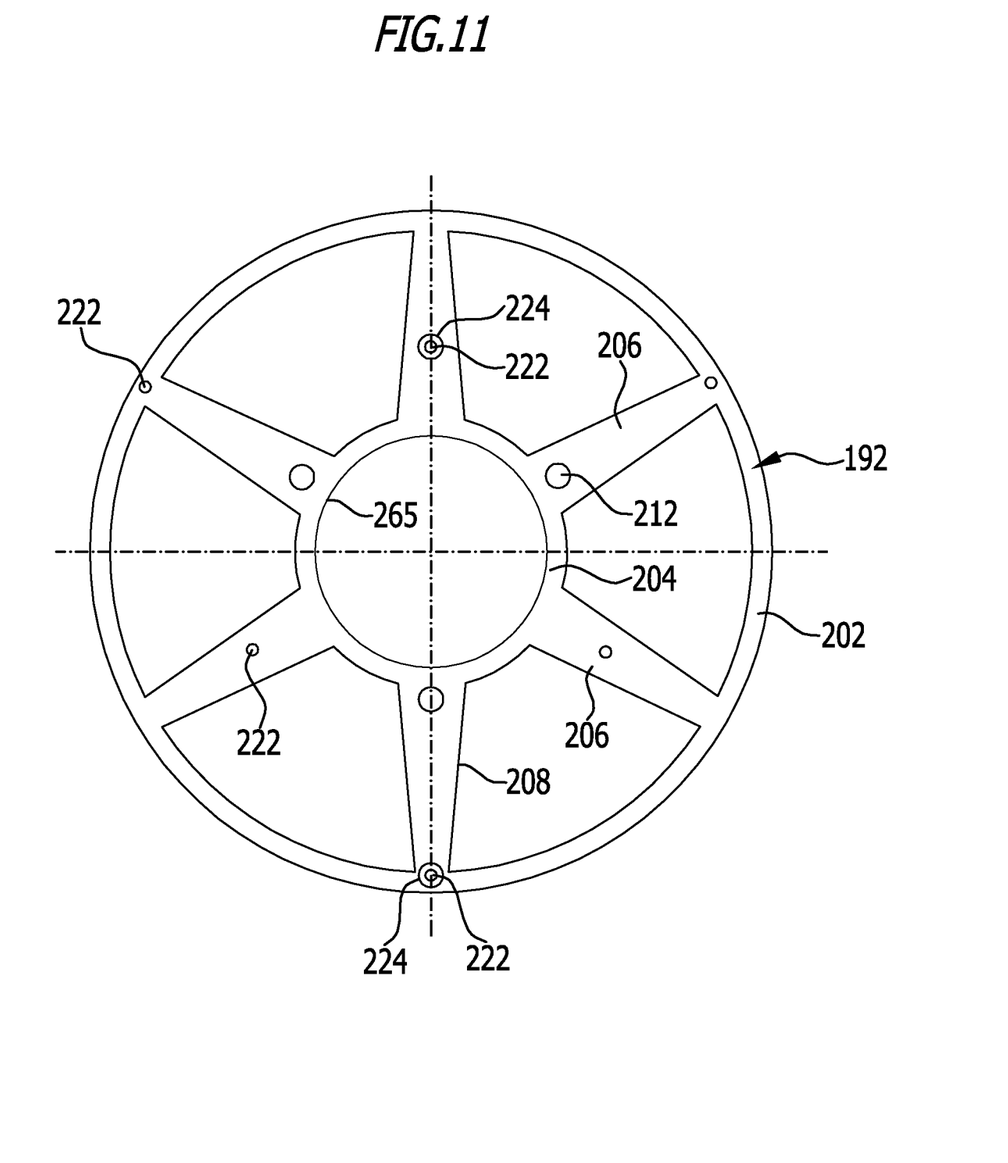
FIG. 11 shows a top view similar to FIG. 6 on a support element with enlarged receiving opening according to the fourth embodiment and FIG. 12 shows a perspective view similar to FIG. 4 of a fifth embodiment of the present invention.

In addition as shown in FIG. 11 support element 192' is also provided with an enlarged receiving opening 265.

Figure 12:
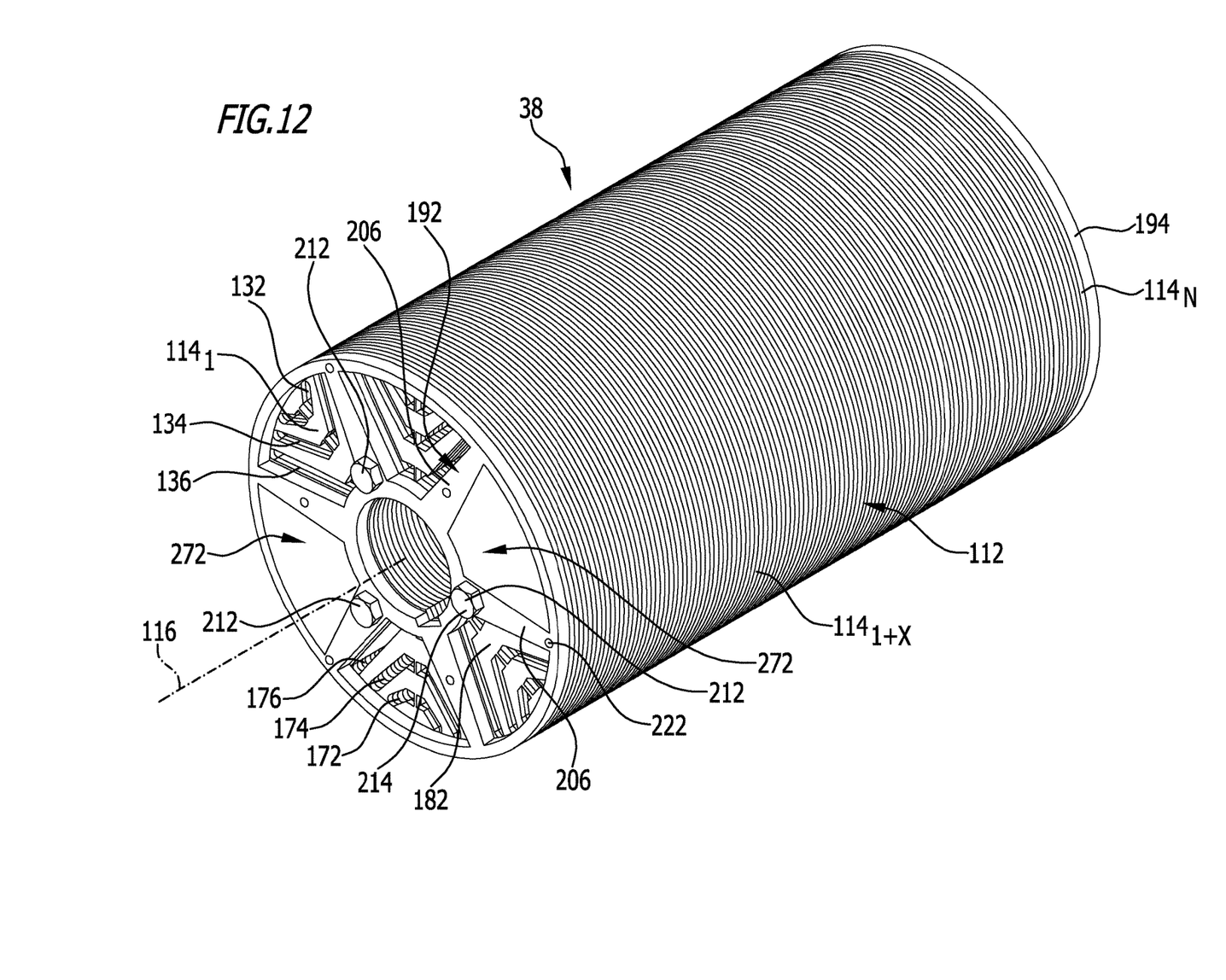

A fifth embodiment shown in FIG. 12 differs from the aforementioned embodiments by having flow reducing elements 272, made of any permeable, partially permeable or non-permeable material, in particular cover elements, are fixed to at least one of the support elements 192, 194 in order to reduce or block the flow through some or all of the channels 172, 174, 176 between adjacent arms 206.

Preferably flow reducing elements 272 are arranged on opposite sides of rotor axis 116 and in particular symmetric thereto.

In particular flow reducing elements 272 are adapted to be releasably fixed to support elements 192, 194 in order to be able to adapt the flow of refrigerant through rotor core 112 to the amount of cooling necessary for the respective compressor in the respective environment.

With respect to all other features which are not mentioned in connection with the fourth and fifth embodiment, the fourth and fifth embodiment are identical with the first embodiment so that with respect to the non-explained features reference is made to the explanations given in connection with the first embodiment.

The invention claimed is:

1. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, said flux barriers are arranged in said rotor core to define channels enabling a flow of refrigerant through said rotor core, said rotor is provided with first support element acting on a first front side of said rotor core and a second support element acting on a second front side of said rotor core, said support elements being provided with cut-out sections and said cut-out sections are designed to uncover at least 70% of a cross section of apertures defined by said flux barriers in the respective disc element forming the respective first and second front sides of said rotor core;

wherein said support elements have arms acting on flux paths of the respective disc element forming the respective front side of said rotor core.

2. Compressor according to claim 1, wherein said cut-out sections in said support elements are designed such that at least 80% of the cross section of said channels in the respective front side is uncovered.

3. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections are designed to uncover at least 70% of a cross action of apertures defined by said flux barriers in the respective disc element forming the respective first and second front sides of said rotor core;

wherein said support elements have arms acting on flux paths extending in radial direction to said rotor axis.

4. Compressor according to claim 3, wherein an angular width of said arms of said support elements is limited to an angular width of said respective radial flux path.

5. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections are designed to uncover at least 70% of a cross section of apertures defined by said flux barriers in the respective disc element forming the respective first and second front sides of said rotor core;

wherein said support elements have an outer ring acting on an outer ring portions of the respective disc element forming said respective front side of said rotor core.

6. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections are designed to uncover at least 70% of a cross section of apertures defined by said flux barriers in the respective disc element forming the respective first and second front sides of said rotor core;

wherein said support elements have an inner ring acting on an inner ring portion of the respective disc element forming the respective front side of said rotor core.

7. Compressor according to claim 1, wherein said support elements are connected by connecting elements extending through said rotor core.

8. Compressor according to claim 1, wherein said connecting elements are arranged in connecting channels formed by connection openings in said disc elements.

9. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, said flux barriers are arranged in said rotor core to define channels enabling a flow of refrigerant through said rotor core, said rotor is provided with a first support element acting on a first front side of said rotor core and a second support element acting on a second front side of said rotor core, said support elements being provided with cut-out sections and said cut-out sections are designed to uncover at least 70% of a cross section of apertures defined by said flux barriers in the respective disc element forming the respective first and second front sides of said rotor core;

wherein said support elements are connected by connecting elements extending through said rotor core;

wherein said competing elements are arranged in connecting channels formed by connection openings in said disc elements; and wherein connection openings of said support elements are arranged in a plurality of arms acting on flux paths of said disc elements.

10. Compressor according to claim 1, wherein said support elements are provided with counterbalancing elements.

11. Compressor for refrigerant having a suction inlet for refrigerant and a pressure outlet for compressed refrigerant, said compressor comprising a compression unit and an electric motor driving said compression unit, said electric motor being a synchronous reluctance motor having a stator and a rotor, said rotor comprising a plurality of stacked disc elements, said disc elements forming a rotor core each disc element having a plurality of flux barriers configured to give the rotor core an anisotropic magnetic structure and formed as apertures in said disc element, a plurality of elements are provided with flow reducing elements for reducing flow of refrigerant through at least part of said channels; and wherein said flow reducing elements are releasably mounted on said support elements.

12. Compressor according to claim 11, wherein said flow reducing elements are cover elements covering at least part of said channels.

13. Compressor according to claim 1, wherein the compressor is provided with a motor housing section said motor housing section being provided with said suction inlet.

14. Compressor according to claim 13, wherein said motor housing section supplies refrigerant to a first front side of the rotor.

15. Compressor according to claim 13, wherein refrigerant is guided in axial direction through said channels in said rotor from said first front side of said rotor to a second front side of said rotor.

16. Compressor according to claim 15, wherein refrigerant is discharged from a second front side of said rotor and guided to said compression unit.

17. Compressor according to claim 13, wherein the suction inlet supplies refrigerant to said electric motor through a suction opening arranged coaxial to an axis of rotation of said rotor.

18. Compressor according to claim 17, wherein said motor housing section is guiding said refrigerant supplied through said suction opening to the first front side of said rotor.

19. Compressor according to claim 1, wherein said rotor is arranged on a shaft and said shaft being supported by bearing systems arranged on opposite sides of said rotor.

20. Compressor according to claim 1, wherein said shaft is supported by bearing systems arranged on opposite sides of said compressor unit.

* * * * *

UNITED STATES PATENT AND TRADEMARK OFFICE
CERTIFICATE OF CORRECTION

PATENT NO. : 10,374,488 B2
APPLICATION NO. : 15/485902
DATED : August 6, 2019
INVENTOR(S) : Franck Repentin Page 1 of 1

It is certified that error appears in the above-identified patent and that said Letters Patent is hereby corrected as shown below:

In the Claims

In Claim 9 at Column 10, Line 30 the word "competing" should be deleted and replaced with the word –connecting–;

In Claim 11 at Column 10, Line 47, the portion reading "a plurality of elements . . ." should read –a plurality of support elements . . . .–

Signed and Sealed this
Twenty-ninth Day of October, 2019

Andrei Iancu
*Director of the United States Patent and Trademark Office*